Jan. 10, 1928.

G. P. RASCK 1,655,738

ROTARY ENGINE

Filed Nov. 29, 1926

Witness
L. F. Sandberg

Inventor
George P. Rasck
by Baird & Freeman Attorneys

Jan. 10, 1928.

G. P. RASCK

ROTARY ENGINE

Filed Nov. 29, 1926

Witness
L. F. Sandberg

Inventor
George P. Rasck
by Bair & Freeman Attorneys

Patented Jan. 10, 1928.

1,655,738

UNITED STATES PATENT OFFICE.

GEORGE P. RASCK, OF DES MOINES, IOWA.

ROTARY ENGINE.

Application filed November 29, 1926. Serial No. 151,428.

The object of my invention is to provide a rotary engine of the type operated by steam, compressed air or similar expansive fluids, which engine is of simple, durable and inexpensive construction.

A further object is to provide in such an engine suitable fluid control means.

More particularly, it is my object to provide such an engine having a rotary piston provided with a plurality of circumferentially arranged grooves to serve as expansion chambers, the grooves being preferably elliptically cam shaped and provided in opposite pairs.

Still a further object is to provide in connection with said grooves suitable pivoted abutments for forming one wall of the expansion chamber, and for sealing purposes.

Still a further object is to provide cams operatively connected to the rotary piston for moving the abutments to maintain them in engagement with the bottom of the cam shaped grooves.

With these and other objects in view, my invention consists in the construction, arrangement and combination of the various parts of my rotary engine, whereby the objects contemplated are attained, as hereinafter more fully set forth, pointed out in my claims, and illustrated in the accompanying drawings, in which:

Figure 4 shows a detail, sectional view taken on the line 4—4 of Figure 1; and

Figure 5 shows a perspective view of one of the pivoted abutments.

Figure 1:
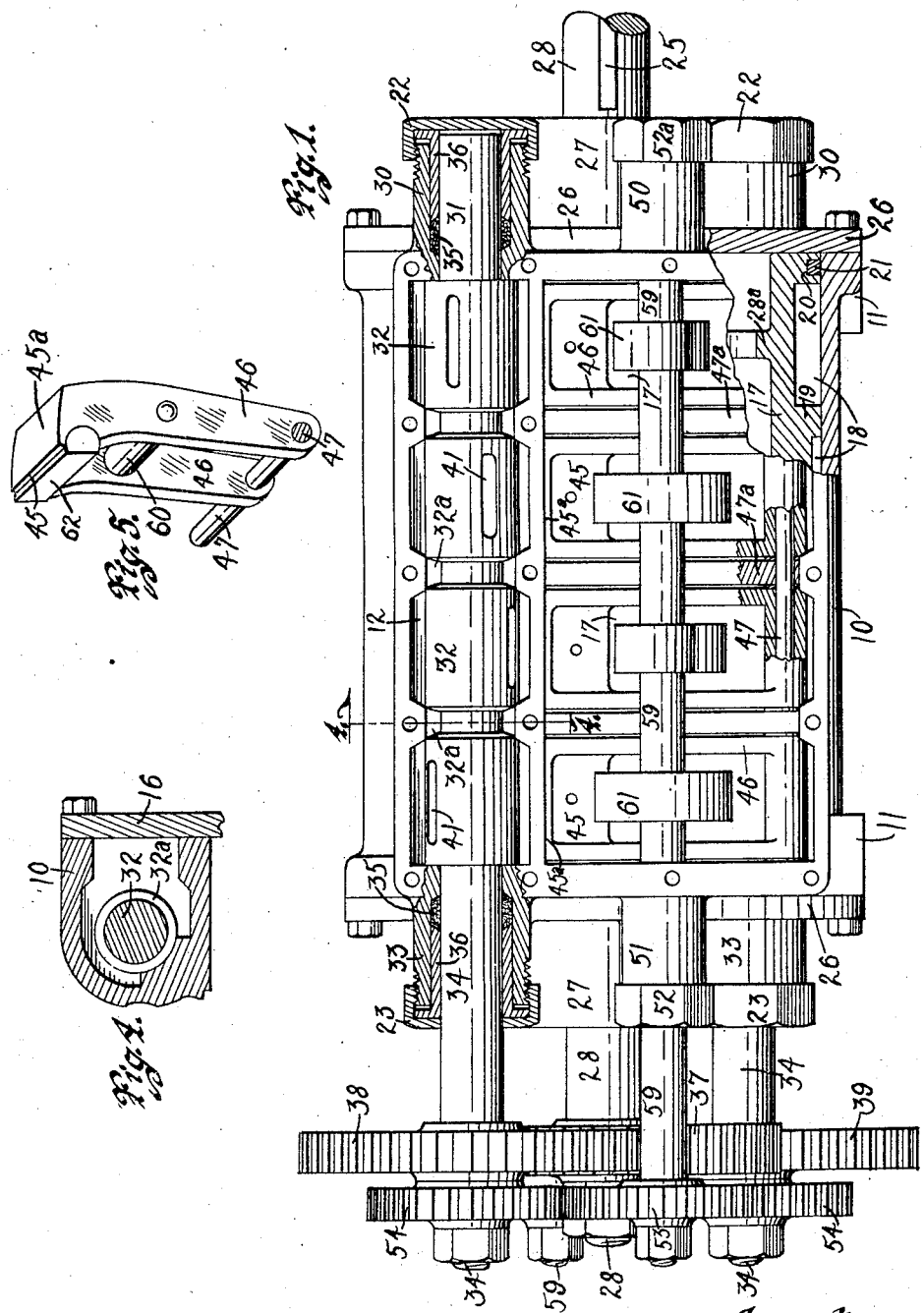
Figure 1 shows a side elevation of a rotary engine embodying my invention, one side plate being removed and parts of the valve spindle bearings being shown in cross section.

In the accompanying drawings, I have used the reference numeral 10 to indicate generally a horizontally arranged cylinder, preferably having the base or supporting members 11.

Arranged at the sides of the cylinder 10 are fluid intake and exhaust manifolds. Arranged opposite each other across the cylinder and near the upper right-hand and lower left-hand portions of the machine respectively are the intake manifolds 12 and 13 having inlets 12$^a$ and 13$^a$.

Below the manifold 12 and above the manifold 13 are the exhaust manifolds 14 and 15, having outlets 14$^a$ and 15$^a$.

At the sides of the machine, so as to thus form the outer walls of the manifolds are removable plates 16, one of which is omitted in Figure 1.

Received in the cylinder 10 is the rotary piston 17, having generally the form of a solid cylinder, with the exceptions hereinafter noted.

The cylinder has a plurality of pairs of grooves 18, the pairs being successively spaced longitudinally of the cylinder. These grooves 18 are arranged in opposite pairs, and in the illustration shown there are four of said pairs.

Figure 3:
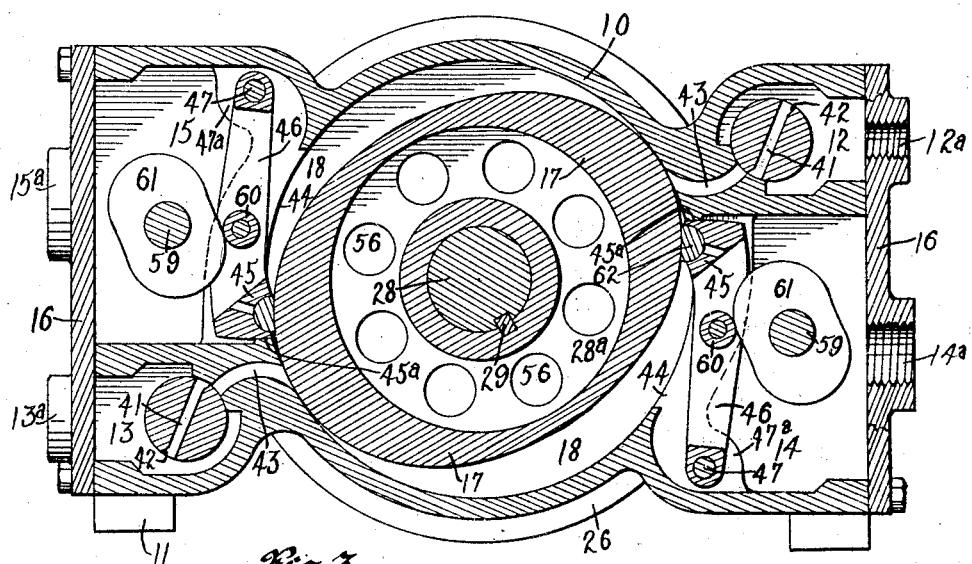
Figure 3 shows a detail, sectional view taken on the line 3—3 of Figure 1, the side plates being assembled.

The grooves of each pair are graduated in depths toward their ends and extend somewhat less than half-way around the piston, as clearly shown in Figure 3.

It will be obvious that at the ends of the piston and between each successive pair of grooves is a disc-shaped portion 19 of the piston. The end disc-shaped portion 19 is provided with a ring groove 20 to receive a resilient expansion ring 21.

Bolted on the ends of the cylinders 10 are end plates 26, having journals 27 formed thereon for the shaft 28, which extends through and is keyed to end webs 28$^a$ of the piston 17 by keys 29. A key way 25 is formed in the shaft 28 whereby operative connection may be had for driving machinery etc., from my engine.

Formed at one end of each intake manifold 12 and 13 is a journal bearing 30, for a spindle 31 of a rotary valve 32. Formed at the other end of each intake manifold 12 and 13 is a journal bearing 33 for a spindle 34 at the other end of the valve 32.

The outer portions of the openings through the journal bearings 30 and 33 are enlarged to receive packing 35 and packing glands 36. The glands 36 are held in place by nuts 22 and 23. The nut 22 has a closed end as clearly illustrated in section in Figure 1.

On the shaft 28 at one end thereof is fixed a spur gear 37, which meshes with spur gears 38 and 39 on the spindles 34 of the rotary valves 32.

Extending radially through the valves 32 opposite the respective pairs of grooves 18 are substantially rectangular passages 41, the ends of which are beveled as at 42.

It will be understood that the holes 41 are arranged in such relation to each other as to admit steam to the grooves 18 in proper order.

Between the passages 41 the valves 32 are reduced as at 32$^a$ to afford a passage for steam circumferentially around the valve to partially balance it.

The wall of the cylinder 10 is provided with steam passages 43 to afford passage of steam from the manifolds 12 and 13 to the respective pairs of grooves 18, it being understood that the respective holes 41 register with the respective passages 43 at the proper times in the rotation of the valves 32.

The walls of the cylinder 10 are provided with circumferentially elongated passages 44 arranged to afford communication between the exhaust manifold chambers 14 and 15 and the respective grooves 18.

For closing the expansion chambers formed by the grooves 18 between the cylinder 10 and the piston 17 during the expansion of steam for actuating the cylinder, I provide for each pair of grooves 18 and for each passage 44 a pivoted abutment 45, having arms 46 pivoted on spindles 47 in the lower and upper parts respectively of the exhaust manifold chambers 14 and 15. The spindles 47 are journalled in partial dividing walls 47$^a$ in the exhaust manifolds 14 and 15 as clearly illustrated in section in Figure 1 of the drawings.

The abutments 45 are provided with packing bars 62 to coact with the bottoms of the grooves 48 and thereby form a seal between the abutments and the rotor. The packing bars 62 are rotatably mounted so that they at all times lay flat against the bottoms of the grooves.

The abutments 45 have their outer surfaces smooth and the walls of the passages 44 are shaped to coact with said surfaces. These surfaces as indicated at 45$^a$ are curved on the arc of a circle, having its center at the center of the spindle or shaft 47. The abutments 45 are actuated for their inward movement by cams 61.

Between the arms 46 are mounted rollers 60 which coact with the cams 61 on the shafts 59. The cams insure accurate movement of the abutments 45 and are particularly adapted for high speed engines. One end of each shaft 59 is journalled in a closed end packed bearing 50 and the other end extends through a bearing 51. The bearings 50 and 51 receive packing similar to the packing 35 which is held in place by packing nuts 52 and 52$^a$. The packing nut 52$^a$ has a closed end similar to the packing nut 22.

On the shafts 59 are secured gears 53 which mesh with gears 54 on the valve spindles 34 whereby the cams 61 are timed to move the abutments 45 synchronously with the piston 17.

Figure 2:
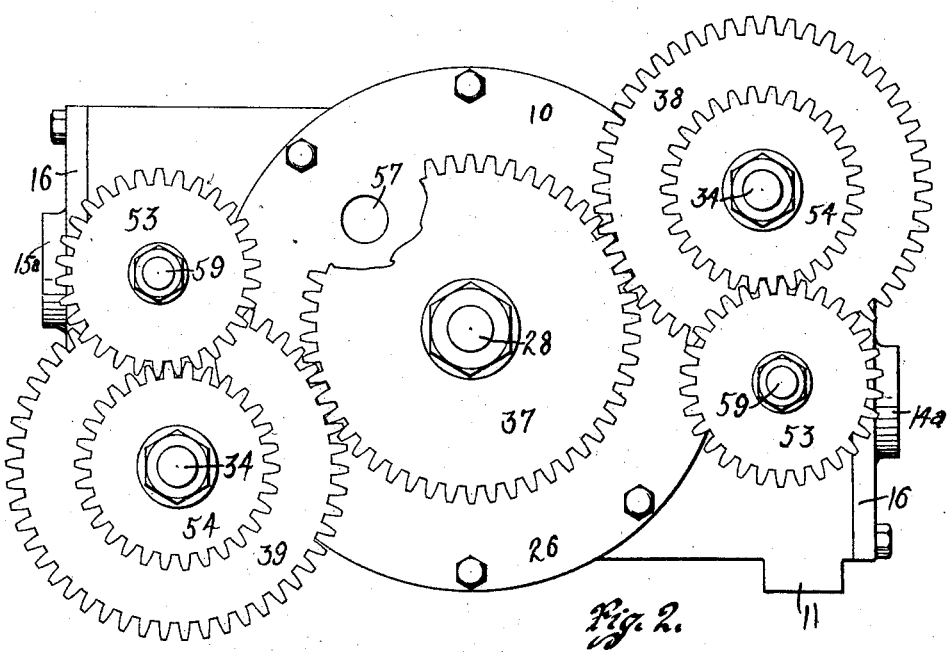
Figure 2 shows an end view of the engine.

Referring to Figure 2, I will now briefly describe the operation of my improved rotary engine.

The passages 41 are so arranged that the steam is admitted to the pairs of grooves 18 beginning at the left-hand end of the cylinder, as shown in Figure 1, in the following order: one—two—three—four—.

The bottoms of the grooves 18 are cam-shaped as shown. The steam enters the expansion chamber bounded by the cam groove 18, cylinder wall adjacent the passage 43 and the abutment 45 through the passages 41 and 43.

As shown in Figure 3, the valve 32 has just reached the point where the valve begins to open and steam begins to pass through the passages 41 and 43, to the first pair of grooves 18.

The expansion of this steam presses against the piston 17 and against the abutment 45. The same thing occurs in connection with both valves 32 and the piston is rotated.

The operation continues until the passage 41 passes the passage 43, whereupon the steam supply is shut off.

At the proper time, it will be noted the high points of the grooves 18 reach the passage or opening 44 on the opposite sides of the cylinder, and the steam is exhausted through the openings 44 and the exhaust manifold chambers 14 and 15. The abutments 45 are forced outward by the bottoms of the cam grooves 18 and are held inward by the cams 61.

It will be seen that the steam acts on the piston as though it were at the outer end of a lever having its inner end at the center of the shaft 28. By providing opposed passages 43 and opposed cam grooves 18, the steam balances on each side of the piston and less side strain is imposed on the shaft 28 and bearings 27.

Steam supply may connect to the inlets 12$^a$ and 13$^a$ and communicate with the respective intake manifold chambers 12 and 13. Any suitable throttle valve or valves not here shown may be provided for controlling the passage of steam to the manifolds 12 and 13.

The speed of the engine may be regulated by means of the throttle valve.

I find that with an engine of this type, I can secure a large horse-power from one compactly made.

It will be noted that my engine is very compact and simple of construction.

The parts are readily accessible for repairs or replacement.

The end webs 28ª of the cylinder 17 are provided with a series of holes or passages 56 for cooling purposes and the plates 26 are provided with similar holes 57.

I find that the abutments 45 are much more easily, quickly and accurately actuated by the cams 61 when the abutments are mounted pivotally than when they are slidably arranged.

Some changes may be made in the construction and arrangement of the various parts of my improved rotary engine without departing from the real spirit and purpose of my invention, and it is my intention to cover by my claims, any modified forms of structure or use of mechanical equivalents, which may be reasonably included within their scope.

I claim as my invention:

1. In a rotary engine, a cylinder having on opposite sides intake manifold chambers and exhaust manifold chambers, said cylinder having passages for communication between said chambers and the interior of the cylinder, a shaft extended through said cylinder, a rotary piston mounted on said shaft in the cylinder, said piston having opposite pairs of grooves, the bottoms of said grooves being cam-shaped, valve shafts rotary valves operated from said shafts in said intake manifold chambers, having openings adapted to register with the respective passages from the intake manifold chambers to the interior of the cylinder at proper times in the rotation of the valve, gearing means for connecting the valve shafts and the piston, an abutment pivotally mounted in each exhaust manifold chamber for each pair of grooves and projecting through the passage between the manifold chamber and the interior of the cylinder, and means actuated from the valve shafts for synchronously moving said pivoted abutments to the inward limit of their movement, said means comprising cams for engaging the abutments.

2. In a rotary engine, a cylinder having on opposite sides intake manifold chambers and exhaust manifold chambers, said cylinder having passages for communication between said chambers and the interior of the cylinder, a shaft extended through said cylinder, a rotary piston mounted on said shaft in the cylinder, said piston having opposite pairs of grooves, the bottoms of the grooves being cam-shaped, rotary valves in said intake manifold chambers, having openings adapted to register with the respective passages from the intake manifold chambers to the interior of the cylinders at the proper times in the rotation of the valve, gearing means for connecting the rotary valves and the piston, an abutment pivotally mounted in each exhaust manifold chamber for each pair of grooves and projecting through the passage between the manifold chamber and the interior of the cylinder, means for holding said pivoted abutments at the inward limit of their movement, comprising cam shafts in the exhaust manifolds, cams on said shafts for coacting with the abutments and means for actuating the cams from the piston.

3. In a rotary engine, a cylinder having on opposite sides intake manifold chambers and exhaust manifold chambers, said cylinder having passages for communication between said chambers and the interior of the cylinder, a shaft extended through said cylinder, a rotary piston mounted on said shaft in the cylinder, said piston having opposite pairs of grooves arranged opposite the respective passages, the bottoms of said grooves being cam-shaped, rotary valves in said intake manifold chambers, having openings adapted to register with the respective passages from the intake manifold chambers to the interior of the cylinders at proper times in the rotation of the valves, gearing means including valve shafts for connecting the rotary valves and the piston, an abutment pivotally mounted in each exhaust manifold chamber for each pair of grooves and projecting through the passage between the manifold chamber and the interior of the cylinder, means for moving said pivoted abutments to the inward limit of their movement comprising cam shafts, cams mounted thereon, and means for actuating said shafts from the valve shafts.

4. A rotary engine comprising a cylinder, a rotary piston mounted therein and having a cam groove, a pivoted abutment, said abutment comprising a packing bar adapted to coact with the bottom of the cam groove, a pair of pivoted arms for supporting said bar, a roller mounted between said arms and a cam operatively connected to the rotary piston for coacting with said roller to maintain said packing bar in engagement with the bottom of the cam groove.

5. A device of the class described comprising an engine block, a cylinder therein, a piston rotatably mounted within the cylinder, a cam groove in said piston, a packing bar cooperating therewith a support for said packing bar comprising a cross bar in engagement with the engine block, pivoted arms formed on said cross bar, a roller between said arms, a cam coacting therewith whereby the packing bar is maintained in engagement with the bottom of the cam groove in said piston.

GEORGE P. RASCK.